United States Patent [19]

Hall

[11] Patent Number: 4,768,533

[45] Date of Patent: Sep. 6, 1988

[54] PAINT AND VARNISH STRIPPING SYSTEM

[76] Inventor: William R. Hall, 4261 Smithsonia Dr., Tucker, Ga. 30084

[21] Appl. No.: 44,316

[22] Filed: Apr. 30, 1987

[51] Int. Cl.$^4$ .............................................. B08B 3/02
[52] U.S. Cl. .................................. 134/111; 134/183; 134/199; 134/200; 239/514; 239/589; 239/590
[58] Field of Search ..................... 134/38, 111, 166 R, 134/171, 182, 183, 198, 199, 200; 239/513, 514, 524, 587, 589, 590

[56] References Cited

U.S. PATENT DOCUMENTS

| | | | |
|---|---|---|---|
| 1,503,495 | 8/1924 | Follin | 239/589 X |
| 2,471,506 | 5/1949 | Wiswall | 134/111 X |
| 2,568,183 | 9/1951 | Bumpus | 134/199 X |
| 2,619,099 | 11/1952 | Young | 134/111 X |
| 2,704,084 | 3/1955 | James et al. | 239/513 X |
| 2,850,326 | 9/1958 | Kofford | 239/513 |
| 3,141,000 | 7/1964 | Turner | 239/524 X |
| 3,392,921 | 7/1968 | Demaison | 239/589 |
| 3,521,815 | 7/1970 | Szasz | 239/513 X |

FOREIGN PATENT DOCUMENTS 2120958  12/1983  United Kingdom ............... 239/524

Primary Examiner—Philip R. Coe
Attorney, Agent, or Firm—Harry I. Leon

[57] ABSTRACT

A closed system paint or varnish stripping apparatus in which the surface finish of furniture and the like can be removed with very little operator contact or maintenance. The system recycles the stripping chemical with only a minimum of filtering being required. Nozzles having an unique design in which the diameter of the orifice is greater than one-half the inside diameter of the supply pipe facilitate spraying the recycled chemical with very little possibility of the nozzles plugging. Moreover, the use of these large orificed nozzles allows the chemical to be sprayed at a high flow rate providing for the drenching of a work piece in several seconds and eliminating much of the mist production and evaporation losses previously associated with paint and varnish stripping operations. In addition, this high flow rate is achieved with only low pressure loss so that low pressure pumps with small motors can be used.

9 Claims, 2 Drawing Sheets

PAINT AND VARNISH STRIPPING SYSTEM

BACKGROUND OF THE INVENTION

In the art of refinishing furniture and other previously painted or varnished objects, a large part of the effort is devoted to the removal of the old paint or varnish. To make this job easier, chemicals are utilized to loosen the finish so that it can be scraped or washed from the surface. The use of chemicals, however, has introduced some new problems. The most widely used stripping chemical is methylene chloride which has been found to be a health hazard and can only be safely handled in closed stripping booths.

The nozzles presently employed in such stripping booths utilize small orifices to form a fine, mist-like spray; and these small orifices have a tendency to clog whenever particulates are present in the stripping chemical. As a consequence, either an apparatus with once-through chemical utilization or one having a fine filter is required. Unfortunately, an intricate filtering system is necessary to protect the high pressure pumps which must be employed to push a liquid even at low flow rates through small orificed nozzles. Moveover, a volatile chemical like methylene chloride must be processed with a layer of a wax-like substance that floats on the surface of the chemical to minimize evaporation losses. But when liquid under high pressure is forced through small orificed nozzles, a cooling effect occurs; and the wax-like layer thickens, contributing further to the problem of nozzle plugging. With nozzle plugging, not only is production slowed down but the operator must enter the stripping booth to service the nozzles and, in the process, contact the chemical which, when dispersed as a fine mist, takes a long time to settle out of the air.

Small orificed nozzles further compound the problems associated with minimizing operator exposure to the stripping chemical because high evaporation losses accompany the production of a fine mist, especially one which must be generated for an extended period of time to coat the surfaces of a work piece due to the low flow rates in the prior art. Moreover, running the large horsepower pumps needed to obtain enough flow at the required pressure through such nozzles is costly.

SUMMARY OF THE INVENTION

The present invention relates to an improved paint and varnish stripping method and apparatus designed to handle stripping chemicals such as methylene chloride in a safer and more efficient manner than was possible heretofore. The heart of the invention is an improved non-clogging spray nozzle. The nozzle is so constructed that all of its passageways are as large as possible while still achieving efficient spraying. Furthermore, in order to prevent clogging, the passageways are made free and open without any projections into them and without any inserted parts to interfere with the spraying action of the nozzle.

In order to get proper dispersion of the stripping chemical, a cylindrical rod having approximately the same diameter as the opening in the nozzle is placed at a distance of one to three diameter lengths from the nozzle outlet and with the centerlines of the nozzle orifice and of the cylindrical rod being disposed perpendicularly to each other. The flow stream impinging on the cylindrical rod is splattered over a wide area. The cylindrical rod has a high drag configuration in which flow separation from the surface along with turbulence aids in the dispersion. The location of the cylindrical rod for the most favorable dispersion pattern is a function of the pump pressure and the chemical utilized, and means for varying the distance between the cylindrical rod and the nozzle outlet is provided.

When the improved nozzle is utilized, recyling of the stripping chemical is facilitated. In the first place, contamination of the chemical is less critical since the nozzle can easily handle small fragments of stripped paint. Indeed, only a minimum of filtering to stop the very large paint chips from being pumped is required. Sufficient filtering can be achieved with the use of a screen having a mesh similar to ordinary window screen. Such a coarse filter has proven to be satisfactory even when the stripping chemical has been recycled for months.

With the improved nozzle, the flow rate can be increased, allowing adequate wetting of the surface of a work piece in several seconds of pumping time. The steps of a process utilizing the non-clogging nozzles in a stripping booth are spraying the work piece with the stripping chemical for only about six seconds, allowing the drenched work piece to stand quiescently in the booth for about twelve minutes while the chemical softens and loosens the finish, and then washing off the loosened paint or varnish by spraying the work piece with the stripping chemical for an additional six seconds. This method removes over ninety percent of the finish without an operator having to have any contact with the chemical; and with proper venting of the stripping booth, the fumes of the chemical can be discharged so as to minimize their concentration in the booth when it is reopened. A neutralization process applied after the work piece is removed from the stripping booth may be employed to remove any remaining finish.

Furthermore, due to the large orifice dimensions of the improved nozzles, the horsepower of the pump used to force liquid through them is greatly reduced; and motors under two horsepower are more than adequate for the spraying process, greatly saving on operating expenses.

In summary, the improved paint and varnish stripping apparatus and method of the present invention save chemicals, time and the health of operators and otherwise reduce the cost of operations.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
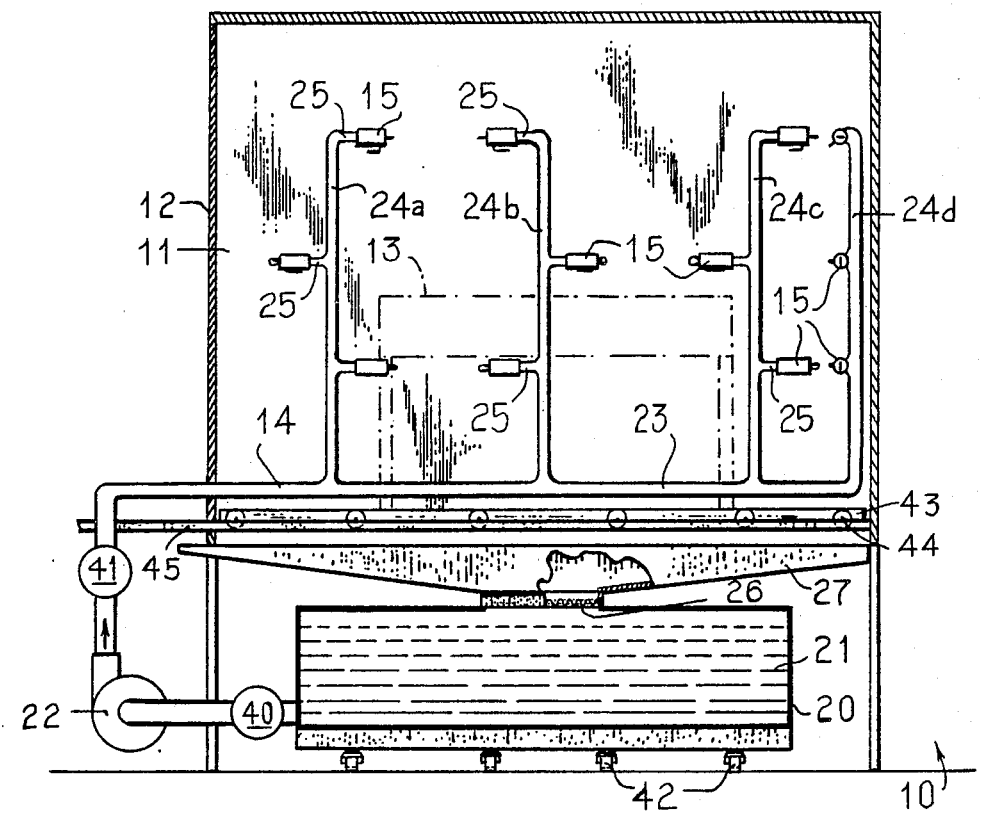
FIG. 1 is an overall view of the apparatus according to the present invention showing the closed chamber of the stripping booth in cross-section and a fragmentary portion of the funnel.

In the drawings, there is shown an apparatus in accordance with the present invention for stripping paint and varnish from surfaces of furniture and the like. As is illustrated in FIG. 1, the apparatus, which is indicated generally by the numeral 10, includes a chamber 11 in which such stripping can be done quickly and with little attention from the operator. The closed chamber 11 is preferably made of sheet metal, wood or plastic and fitted with a door 12 which opens wide so that a work piece 13 can be easily moved in or out of the chamber 11. When the door 12 is closed, it seals in the vapor fumes of a stripping chemical 21.

Figure 2:
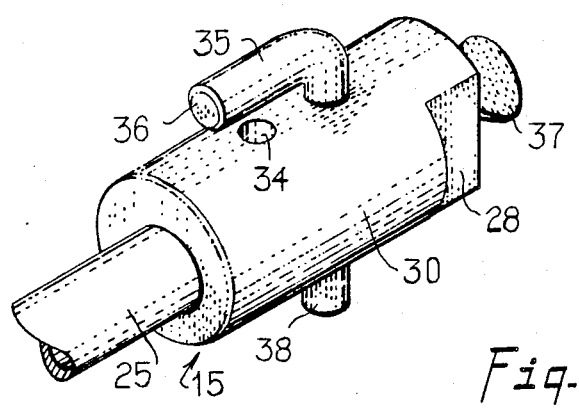
FIG. 2 is a perspective view of a liquid distribution assembly in accordance with the invention.

The chemical 21 is stored in a tank 20 and, by the use of a pump 22, is forced through a distribution system 14 into the chamber 11. The system 14 includes a pipe 23 which feeds a plurality of riser pipes 24a, 24b, 24c, 24d extending upwardly along three walls of the chamber 11. In the apparatus 10, which may contain many more riser pipes than those illustrated in FIG. 1, each riser pipe takes a share of the flow from the distribution pipe 23 and feeds this flow into a plurality of supply pipes 25. As the flow leaves the supply pipes 25, it enters a plurality of dispersion assemblies 15 and discharges through a plurality of nozzles 30 (FIG. 2) before impinging upon the work piece 13. In the preferred embodiment, the flow rate through each of the nozzles 30 is about 3 gpm, sufficiently large that in a typical apparatus 10 having two dozen nozzles 30, the work piece 13 is drenched in a time interval which is as short as six seconds. Once the exposed surfaces of the work piece 13 have been wetted with the chemical 21, the pump 22 is shut down; and the chemical 21 is allowed about twelve minutes to attack the finish, softening it. Afterwards, the work piece 13 is again drenched with the chemical 21; and in the process, much of the softened finish is sloughed off.

Most of the chemical 21 which is not consumed in the stripping operation collects in a funnel 27 and drains back into the tank 20 after passing through a screen 26. The chemical 21 can then be reused when the cycle is repeated. In practice, a screen formed of a single layer of a 16 mesh screen with 14 mil brass wire has been found to be adequate for preventing the clogging of the nozzles 30, described hereinbelow, and of the pump 22 which, in the preferred embodiment, is a centrifugal pump even after three months of recycling the chemical 21 through the apparatus 10.

Figure 4:
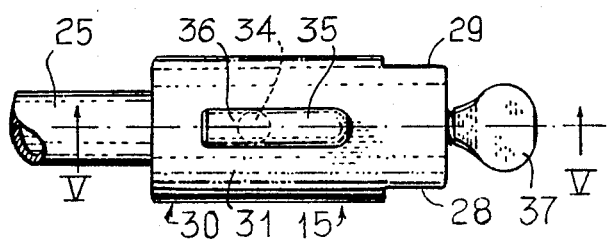
FIG. 4 is a plan view of the discharge side of the assembly according to FIG. 2.
Figure 6:
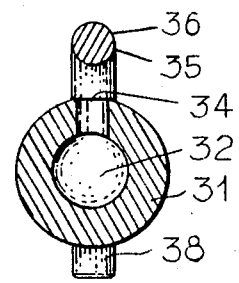
FIG. 6 is a cross-sectional view taken along line VI—VI of FIG. 3.
Figure 5:
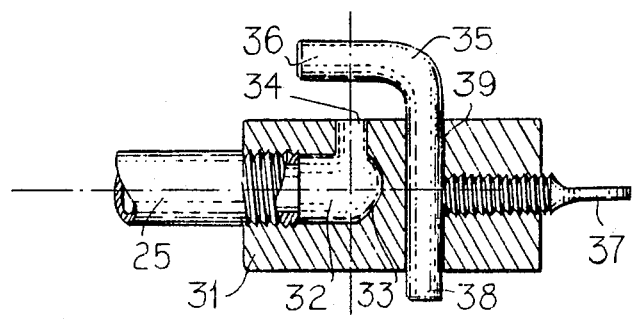
FIG. 5 is a cross-sectional view taken along line V—V of FIG. 4.

The heart of the invention is the nozzles 30 which are non-clogging and allow for a high flow rate with low pressure losses. For a given pump, the use of these nozzles results in a higher flow rate than that which can be obtained with the use of the same number of nozzles having small orifices. Flow enters each of these nozzles through a supply pipe 25 that is threaded into the nozzle body 31 with the centerlines of the pipe 25 and of the nozzle orifice 34 being disposed perpendicularly to each other (FIGS. 4 and 5). Such a configuration facilitates the orientation of the centerline of the orifice 34 by rotating the nozzle body 31 about the centerline of the pipe 25; at the same time, the amount of space taken up by the dispersion assembly 15 within the chamber 11 is kept to a minimum. Means for adjusting the direction of the flow from the nozzle 30 includes wrench holding sites 28, 29 formed in the body 31 which faciliate rotating it about pipe 25.

Figure 3:
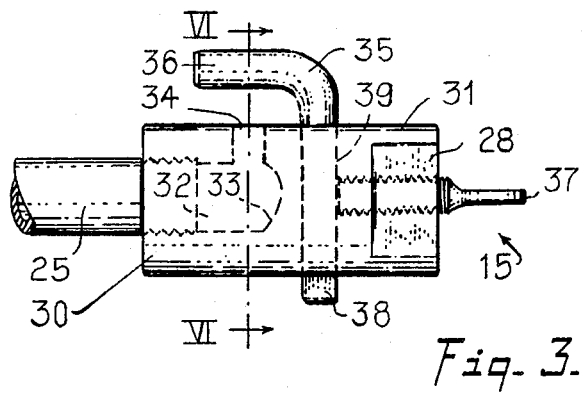
FIG. 3 is a side elevation view of the assembly according to FIG. 2.

The nozzle may be made of any metal or plastic but the material of choice to date is brass. The flow passageway including a region 32 thereof is kept as large as possible as is the radius of curvature of an elbow turn 33 (FIGS. 3 and 5). The flow stream is discharged though the orifice 34 which, in the preferred embodiment, has a diameter which is greater than one-half the inside diameter of the supply pipe 25, the orifice 34 being, by way of example, at least 3/16 inch in diameter and the supply pipe 25 being ¼ inch Schedule 40 or Schedule 80 pipe. The large orifice 34 and the smooth flow channel within the nozzle can easily handle the chemical 21 contaminated with particles of removed finish. Experience has shown that a nozzle with an orifice 34 having a 7/32 inch diameter is, after three months of use, trouble free in operation as far as any clogging is concerned when the chemical 21 is methylene chloride and contains fragments of stripped paint which can pass through a 16 mesh screen with 14 mil brass wire (standard window size screen).

As the flow is discharged through the orifice 34, it impinges upon a dispersion bar 35. This bar, an arm 36 of which is proximate the orifice 34 and has the form of a cylindrical rod, facilitates dispersion of the chemical 21 as it exits the nozzle 30 to insure that the workpiece 13 is covered with the chemical 21. The arm 36, which is aligned perpendicularly to the direction of the flow, has an aerodynamic configuration in which the flow impinging on the arm separates from it on its downstream side but in the process, a region of negative pressure is created behind the arm. Due to this negative pressure, the flow then tries to move back into this region. As a result, the arm 36 gives rise to a mixture of turbulence, back flows, and eddying wakes in the flow from the nozzle 30, so that the flow is dispersed over a wider field than it would otherwise reach while, at the same time, some direct spray is also achieved. In the apparatus 10, it is not critical that the flow from the nozzles 30 be evenly dispersed throughout the chamber 11 but rather that every section of an exposed surface of the work piece 13 be drenched with the chemical 21.

The optimum distance between the orifice 34 and the arm 36 of the dispersion bar 35 is a function of the pressure, the flow rate and the chemical used. Experience has shown that positioning the arm 36 at a distance from the orifice 34 of one to three diameters of the orifice gives optimum dispersion in an apparatus 10 utilizing methylene chloride as the stripping chemical 21 which is pumped at a rate of about 3 gpm through an orifice having a diameter of about 7/32 inch. Means for adjusting this distance includes the body 31 having a hole in which a support member 38 of the dispersion bar 35 can be moved and locking means such as a thumb screw 37, a set screw (not shown) or other fastener which is threadedly engaged with the body 31 for securing the bar in position. In order to keep the dispersion bar 35 in correct alignment relative to the orifice 34, a section 39 of the member 38 is flattened to provide a non-rotatable contact between the bar and the screw 37 (FIGS. 3 through 5).

To facilitate moving the work piece 13 in and out of the chamber 11, the apparatus 10 in the preferred embodiment includes a rack 43 on which the work piece rests, with the rack having a plurality of rollers 44 movable in a track 45 (FIG. 1). The apparatus 10 is also provided with valves 40, 41 so that the pump 22 can be serviced without the loss of the chemical 21. Casters 42 support the tank 20 and add to the ease of filling or of discharging it.

While the invention has been described with reference to a specifically illustrated nozzle assembly, it will be understood that various minor changes in the shapes and dimensions of the parts may be made without departure from the intended spirit and scope of the invention.

Having described the invention, what is claimed is:

1. In an apparatus for stripping a finish from a coated surface of a work piece, the apparatus comprising:
   a. a closed container;
   b. means for pumping a liquid chemical capable of softening the finish;
   c. a distribution system for receiving flow from said pumping means and moving the flow within the inside walls of the container;
   d. at least one nozzle and a supply pipe fluidly connected to the distribution system, the nozzle receiving flow from the distribution system directly through the supply pipe, the nozzle having a flow passageway, the upstream end thereof being disposed contiguous with the supply pipe, and an orifice through which the flow is discharged; the flow passageway incuding a straight flow channel which is narrower than the remainder of the passageway and which terminates at the orifice, each of the flow cross-sections of the channel having approximately the same diameter as the orifice, and a region of uniform cross-section which is disposed proximate the upstream end of the channel; the diameter of the orifice being greater than one-half the equivalent diameter of any flow cross-section of said region less the wall thickness of the supply pipe;
   e. means for spreading the flow from the nozzle into a wider field than the flow would reach in the absence of the spreading means but including most of the field which the flow would reach if the spreading means were not present, the spreading means being disposed in the path of the flow downstream of the orifice, a portion of the spreading means upon which the flow directly impinges having at least one cross-section transverse to the centerline of the channel which extends substantially farther away, in both directions, from said centerline along the first of two imaginary perpendicular axes which intersect the centerline and are disposed perpendicularly thereto than along the second of said axes, the shortest distance which said cross-section of the spreading means extends along the second axis being approximately equal to the radius of the orifice, the first axis being disposed generally horizontally; and
   f. the bulk of the flow impinging upon the spreading means, when the flow is discharged with sufficient velocity to spray the work piece, splattering over a wide area.

2. The apparatus according to claim 1 that further comprises means for collecting said chemical after it has been sprayed for reuse, the collecting means having:
   a. a slanted floor section into which any overspray of the chemical can drain;
   b. means for filtering large particles which may be present in the chemical as it flows out of the slanted floor section; and
   c. a reservoir for storing the chemical before it is pumped back into the distribution system.

3. The apparatus according to claim 2 in which the filtering means is further characterized as having only stationary filter material with a porosity similar to that of a screen having a mesh and wire size used for ordinary window screens.

4. The apparatus according to claim 1 wherein the spreading means further comprises a cylindrical rod, said cross-section of the spreading means being a longitudinal cross-section of the cylindrical rod, the cylindrical rod being located at a distance of at least one nozzle orifice diameter from the nozzle orifice.

5. In an apparatus for stripping a finish from a coated surface of a workpiece, the apparatus comprising:
   a. at least one nozzle having a flow passageway and an outlet through which flow is discharged as a continuous stream, the flow passageway including a straight flow channel which terminates at the outlet; and
   b. a cylindrical rod having a diameter approximately equal to the diameter of the outlet, the rod being spaced from the outlet and downstream of it with the centerline of the rod being disposed perpendicularly to the direction of the flow leaving the nozzle, the distance of the rod from the outlet being in the range of one to five diameters of the outlet, the cylindrical rod lying across the centerline of the straight flow channel, the rod extending longitudinally, in both directions, from said centerline a distance greater than the diameter of the rod, the surface of the rod closest to the outlet having a radius of curvature equal to one-half the diameter of the rod, so that the bulk of the flow impinging upon the rod hits against a curved surface thereof.

6. The improvement according to claim 5 wherein the nozzle is further characterized as being capable of handling the flow when it is contaminated with fragments of removed finish.

7. The improvement according to claim 5 which further comprises means for adjusting the distance separating the cylindrical rod from the nozzle outlet, the adjusting means including a support member which is in slidable contact with the body of the nozzle, the support member being slidable over an interval greater than the diameter of the rod, so that the cylindrical rod can be disposed at an optimum distance from the nozzle outlet.

8. In an apparatus for stripping old finish from a coated surface of a workpiece with the use of a chemical that is sprayed onto the workpiece in a closed container, wherein the improvement comprises:
   a. a spray nozzle having a flow passageway and an outlet through which the flow is discharged, the flow passageway including a straight flow channel which terminates at the orifice, the outlet having an at least 3/16 inch equivalent flow diameter;
   b. a cylindrical rod having a diameter approximately equal to the diameter of the outlet, the rod being spaced from the outlet and downstream of it with the centerline of the rod being disposed perpendicularly to the direction of the flow leaving the nozzle, the distance of the rod from the outlet being in the range of one to five diameters of the outlet, the cylindrical rod lying across the centerline of the straight flow channel, the rod extending longitudinally, in both directions, from said centerline a distance greater than the diameter of the rod, the surface of the rod closest to the outlet having a radius of curvature equal to one-half the diameter of the rod, so that the flow impinging upon the rod hits against a curved surface thereof; the rod being disposed generally horizontally; and c. the bulk of the flow impinging upon the cylindrical rod splattering over a wide area.

9. The improvement according to claim 8 which further comprises:

a. means for collecting overspray from the nozzle;
b. means for filtering the overspray comprising a coarse screen; and
c. means for recycling the stripping chemical, the recycling means comprising a low pressure, high volume pump.

* * * * *